(No Model.)

F. C. DAMM.
BALL TRAP WITH FLEXIBLE THROWING ARM.

No. 455,310. Patented July 7, 1891.

WITNESSES.
Frank M Giller.
Albert H. Bates.

INVENTOR.
Frederick C Damm
By his Attorneys
Watson & Thurston

UNITED STATES PATENT OFFICE.

FREDRICK C. DAMM, OF FINDLAY, OHIO.

BALL-TRAP WITH FLEXIBLE THROWING-ARMS.

SPECIFICATION forming part of Letters Patent No. 455,310, dated July 7, 1891.

Application filed July 24, 1890. Serial No. 359,719. (No model.)

*To all whom it may concern:*

Be it known that I, FREDRICK C. DAMM, a citizen of the United States, residing at Findlay, in the county of Hancock and State of Ohio, have invented certain new and useful Improvements in Target-Traps, of which the following is a full, clear, and exact description.

My invention relates to traps for throwing dish-shaped flying targets.

The objects of my invention are, first, to provide novel mechanism in a trap for throwing flying targets, whereby said targets will not be broken by the jar incident to the beginning of the motion of the throwing-arm, but will be thrown forward and given an independent axial rotation, and, second, to improve the construction of the standard, whereby the trap may be easily and securely adjusted in a position to throw a target in any desired direction.

To this end my invention consists in the construction and combination of parts herein described, and pointed out definitely in the claims.

Figure 1:
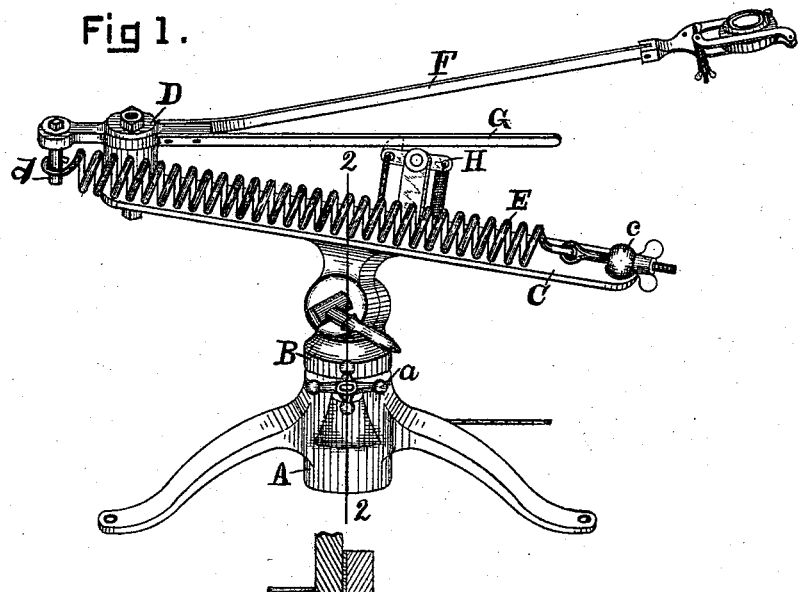
Figure 2:
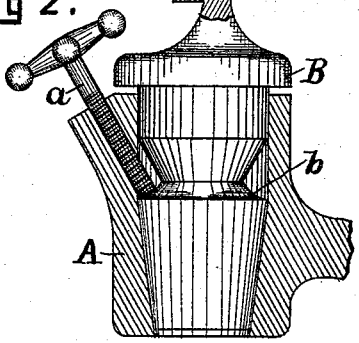

In the drawings, Figure 1 is a perspective view of my improved trap, and Fig. 2 is a vertical central section on line 2 2 of Fig. 1.

In said drawings, A represents the base of the standard, and B a vertical spindle which supports the throwing mechanism. The lower end of this spindle is tapered and fits into a tapered socket in the base A. This spindle may be revolved in its socket to a position in which the throwing-arm will discharge the target in any desired direction. The spindle is provided with an annular shoulder $b$, and a screw $a$, having its bearings in the base, is screwed against this shoulder $b$, thus driving the tapered end of the spindle into its tapered socket, whereby any rotary motion of said spindle is prevented. On top of the spindle is a plate C. D represents a head pivoted on a substantially vertical pivot to the plate C.

E represents a coiled spring, one end of which is fastened to a stud $c$ upon one end of the plate and the other end is fastened to a pin $d$ on one end of the pivoted head D.

F represents the throwing-arm, in the form of a flat spring rigidly secured to the head D by suitable bolts or rivets. On the outer end of this spring-arm is secured a target-carrier, of any suitable construction, adapted to hold the dish-shaped flying targets which this trap is designed to throw. G represents a rigid arm, secured also to the head D and lying either parallel to or at any suitable angle to the spring-arm F.

H represents a latch adapted to engage with the arm G, as shown in Fig. 1, when the trap is set preparatory to throwing the target. It will be noticed that when the trap is thus set the spring E is expanded, and when the latch is released this spring causes the head D and its connected parts to revolve rapidly upon its pivot. When the head thus begins its revolution, the jar incident to such beginning would tend to fracture the target in the carrier if the arm to which said carrier is attached were rigid; but since this arm is in the form of a spring this jar is taken up without injury to the target.

If, instead of employing the rigid arm G or its equivalent to engage with the latch when the trap is set, the spring-arm F were caused to engage directly with said latch, the same sort of jar would occur at the instant of release, which, as before stated, would tend to break said target, and thus defeat the end for which the trap is employed. Therefore, to secure the most satisfactory results in the described trap, a spring-throwing arm, an independent spring for actuating it, and some device other than the spring-arm for engaging with the latch when the trap is set are necessary. When the head in revolving passes the position in which the pivot and the two points of attachment of the spring E are in line, the spring E is again expanded, which results in suddenly checking and finally stopping the revolution of said head. When the revolution of the head is thus checked, the target-carrier continues to move for an instant at substantially its former velocity, thereby causing the spring-arm F to bend, whereby the carrier is drawn inward out of the circular path in which it has been traveling. This motion of the carrier causes the target to be released from the carrier, whereupon it flies away from the trap, its flight being due to the centrifugal force generated by the revolution of the throwing-arm.

The target in flight has an independent axial rotation, which is due to the difference in rapidity at which the outer and inner edges are moving at the instant of release, and to the further fact that the sudden withdrawal of the carrier from the target does not overcome the tendency to axial rotation thus acquired by the target.

Having thus described my invention, what I claim as new, and desire to secure by Letters Patent, is—

1. The combination of a pivoted head D, and a spring adapted to rotate said head and suddenly check such rotation, a spring-arm secured to said head, and a target-carrier secured to said arm, and a latching-arm secured also to said head, and a latch, substantially as and for the purpose specified.

2. In a target-trap, the combination of a base having a tapered socket, a spindle which supports the throwing mechanism, having a tapered end and an annular shoulder, and a set-screw having its bearings in the base and adapted to engage with said shoulder, substantially as and for the purpose specified.

FREDRICK C. DAMM.

Witnesses:
O. A. BALLARD,
FRANKLIN FRANKS.